(12) United States Patent
Olszewski

(10) Patent No.: US 10,736,467 B1
(45) Date of Patent: Aug. 11, 2020

(54) COOKING UTENSIL

(71) Applicant: William Eugene Olszewski, Middletown, DE (US)

(72) Inventor: William Eugene Olszewski, Middletown, DE (US)

(*) Notice: Subject to any disclaimer, the term of this patent is extended or adjusted under 35 U.S.C. 154(b) by 213 days.

(21) Appl. No.: 15/901,882

(22) Filed: Feb. 21, 2018

Related U.S. Application Data

(60) Provisional application No. 62/462,344, filed on Feb. 22, 2017.

(51) Int. Cl.
*A47J 43/28* (2006.01)
*A47J 45/08* (2006.01)

(52) U.S. Cl.
CPC .......... *A47J 43/288* (2013.01); *A47J 43/283* (2013.01); *A47J 45/08* (2013.01)

(58) Field of Classification Search
CPC ........ A47J 43/288; A47J 43/283; A47J 45/08; A47J 43/20
USPC ........ 294/7, 32, 8, 179; 99/426–442; 30/142
See application file for complete search history.

(56) References Cited

U.S. PATENT DOCUMENTS

| | | | | |
|---|---|---|---|---|
| 869,690 A * | 10/1907 | Brown | A47J 29/06 220/23.2 |
| D54,150 S * | 11/1919 | Underhill | 294/7 |
| 2,092,878 A * | 9/1937 | Hess | A47J 43/281 30/142 |
| 2,799,086 A * | 7/1957 | Tupper | G01F 19/002 30/142 |
| 2,813,742 A * | 11/1957 | Neugebauer | A47G 23/0266 220/737 |
| 3,161,156 A * | 12/1964 | Batista | A23G 3/0273 220/23.4 |
| 4,681,027 A * | 7/1987 | Meamber | A47J 37/10 99/422 |
| D302,776 S * | 8/1989 | Hiscott | D7/692 |
| 5,230,156 A * | 7/1993 | Patenaude | A47J 43/20 30/123.3 |
| 5,573,292 A * | 11/1996 | Citino | A47J 43/283 294/7 |
| 5,741,036 A * | 4/1998 | Ring | A01K 1/0114 209/418 |
| 5,934,722 A * | 8/1999 | Evans | A47J 43/281 294/7 |
| 6,012,750 A * | 1/2000 | Swartz | A47J 43/288 294/7 |
| 7,011,015 B1 * | 3/2006 | Marghella | A47J 43/20 294/7 |
| 8,381,639 B2 * | 2/2013 | Ewald | A23L 15/00 426/614 |
| D725,435 S * | 3/2015 | Binelo | D7/395 |
| 10,028,621 B1 * | 7/2018 | Galik | A47J 43/20 |
| 2002/0092180 A1 * | 7/2002 | Tomasulo | A21C 11/106 30/316 |

(Continued)

FOREIGN PATENT DOCUMENTS

CA 2208037 A1 * 1/1999 ............. A47J 37/01

*Primary Examiner* — Paul T Chin
(74) *Attorney, Agent, or Firm* — Ramberg IP, LLC

(57) ABSTRACT

A cooking utensil based upon, or modified from a spatula, the utensil provided with a heat conductive region ("paddle"), a handle, preferably thermally insulating, and a plurality of circular reservoirs for holding food to be cooked. The handle and the circular reservoirs are attached to the heat conductive region to form a unitary article.

17 Claims, 3 Drawing Sheets

(56) References Cited

U.S. PATENT DOCUMENTS

| | | | |
|---|---|---|---|
| 2005/0045046 A1* | 3/2005 | Cheng | A47J 27/122 99/422 |
| 2007/0224333 A1* | 9/2007 | Ewald | A47J 43/20 426/614 |
| 2017/0215649 A1* | 8/2017 | Hughes | A47J 43/288 |
| 2018/0344094 A1* | 12/2018 | Feather | A47J 43/283 |

* cited by examiner

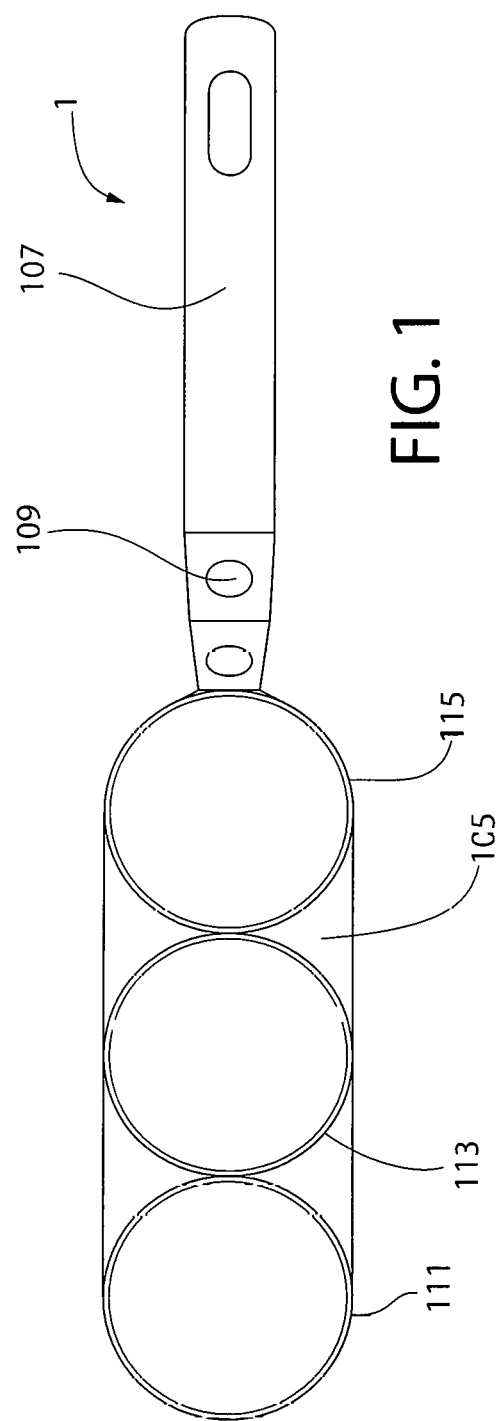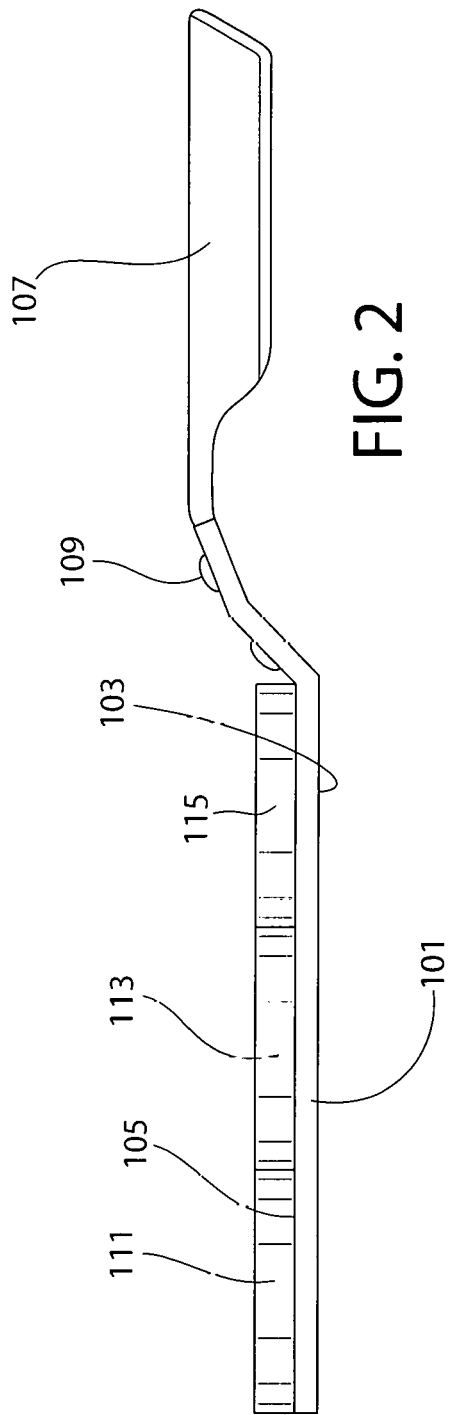

COOKING UTENSIL

CROSS-REFERENCE TO RELATED APPLICATION

This patent document claims the benefit of commonly owned U.S. Provisional Pat. Application No. 62/462,344, filed Feb. 22, 2017. The entire contents of this provisional patent application are expressly incorporated by reference herein.

STATEMENT REGARDING FEDERALLY SPONSORED RESEARCH

None.

BACKGROUND OF THE INVENTION

1. Field of the Invention

The instant invention relates to cooking utensils, and features elements that are similar to spatulas and muffin tins.

2. Discussion of Related Art

Among the challenges in cooking foods that start out as liquid or "runny" but are intended to coagulate or congeal during the cooking process is that the food may not maintain a desired shape such as round when placed into contact with the cooking surface. Further, if the food is inverted or flipped over during the cooking process to cook the side not originally in contact with the cooking surface, the food may spatter. Not only is the spatter unsightly, but the spattered portion may cook more quickly than the rest of the food, producing a crunchy portion of the food that may be unappetizing. Eggs and pancakes are two foods that come to mind as being susceptible to these problems. Typically, a spatula is used to flip over the partially cooked food product.

A number of proposed solutions to this problem involve more of an enclosed pan rather than a spatula. In fact, one such solution expressly states that it is not a spatula, and that spatulas are not needed for removing the food from the pan. The enclosed pan approach typically involves a piece of sheet metal hingedly attached to the pan and, in the closed position, forming a seal with the top of the pan. This permits the entire pan to be inverted at about the halfway point in the cooking process so that the upper part of the food can be brought into close proximity to the heat source.

Among the drawbacks of this "enclosed pan" approach is that the apparatus is more complex than a spatula, and thus more costly. The hinge region can be difficult to clean. If the lid becomes deformed, for example, by warping with heat, then it will not seal correctly, potentially allowing partially cooked food to leak out. Also, with the lid closed, or mostly closed, it may be difficult to monitor the cooking process, at least visually.

Another proposed solution is a flexible rubber or plastic mold featuring seven reservoirs for confining pancake batter during cooking. The reservoirs are arranged in a hexagonal pattern, with one additional reservoir in the center of the hexagon, for a total of seven. The reservoirs are open to the bottom as well as the top. The structure thus is similar to a ring mold. This ring mold design features a tab or flange on the left and right sides, respectively, for grasping and flipping the ring mold over, for example, to cook the (former) top sides of the pancakes. Among the drawbacks of this design is the partially cooked food has a tendency to fall through the bottom opening in the reservoirs during the flipping process. Another problem is that the ring mold is made from a polymer material, which is not as heat-resistant as metal. Another problem is this ring mold requires two hands for the flipping process. Yet another problem is that, once the partially cooked food has been flipped over, the ring mold cannot then be used to remove the fully cooked food from the pan or griddle; a separate spatula is needed.

The instant invention addresses and solves these problems.

SUMMARY OF THE INVENTION

In accordance with the instant invention, a modified spatula structure is provided with a heat conductive region, a handle, preferably thermally insulating, and a plurality of reservoirs, cups or wells for holding food to be cooked. The handle and the reservoirs are attached to the heat conductive region to form a unitary article.

BRIEF DESCRIPTION OF THE FIGURES

FIG. 1 is a front or top view of the "modified spatula" cooking utensil of the instant invention.

FIG. 2 is a side view of the cooking utensil.

All of the figures are according to the instant invention.

DETAILED DESCRIPTION OF EMBODIMENTS OF THE INVENTION

The various embodiments of the article of the present invention feature a device that at least somewhat resembles a known spatula, at least in the sense that if includes a handle, and a paddle or blade extending distally from the handle. Unlike prior art spatulas, however, that of the present invention features a reservoir, cup or well for holding the liquidy food product. In fact, most embodiments of the present invention feature a plurality of such reservoirs, for simultaneously cooking multiple articles of food. The present "modified spatula" article is open to the top, and closed or enclosed on the bottom. The exterior bottom surface or surfaces are generally planar so as to make good contact with a flat surface such as with the cooking surface of a pan or griddle.

A first aspect of the invention

The following summarizes a first aspect of the "spatula improvement" of the present invention:

A cooking utensil, comprising:
 (a) a heat conductive region having a proximal end, an upper surface and a lower surface, said lower surface comprising at least one planar surface;
 (b) a handle attached to said proximal end of said heat conductive region; and
 (c) said upper surface comprising a plurality of circular reservoirs, each of said reservoirs defining sufficient volume as to be able to hold a large hen's egg.

Figure 3:
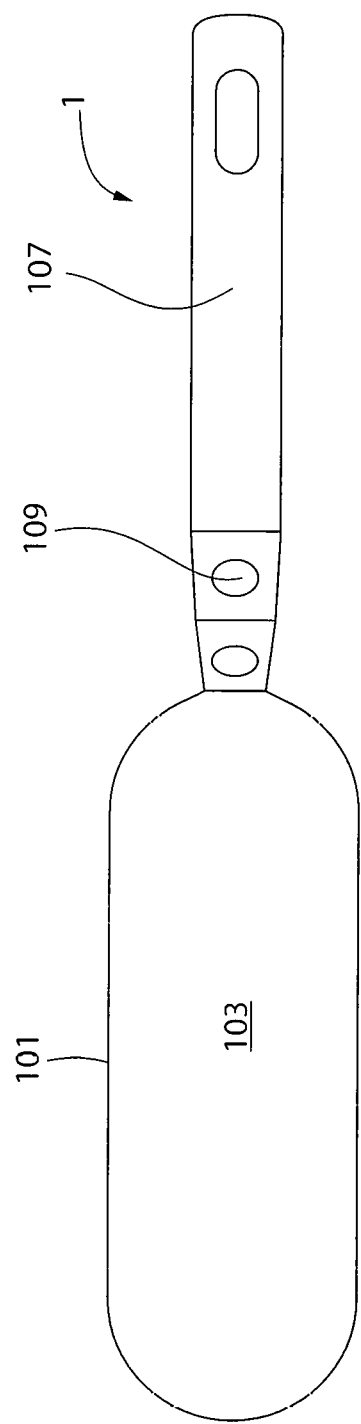
FIG. 3 is a bottom view of the cooking utensil.

Referring now to the figures, where like numbers identify and describe like parts, FIG. 1 is a front or top view of one embodiment of the instant invention; FIG. 2 is a side view. In particular, cooking utensil 1 features paddle or heat conductive region 101 designed to transfer heat quickly and efficiently from bottom surface 103 to top surface 105. The bottom surface 103 is best seen in the side view of FIG. 2, or the bottom view of FIG. 3. Paddle 101 may be fabricated from a substance having high thermal conductivity such as copper. Paddle 101 may be elongated, for example, measuring about 9 inches long by about 3 inches wide as shown, and having a thickness of about 0.0625 (1/16) inch. A handle 107 is attached to the proximal end of the paddle. The handle is configured for grasping by a human hand. As such, it may be fabricated from a thermally insulating material, or may be coated with such a material, such as plastic. The attachment may be by means of one or more rivets 109. In this first aspect of the invention, the handle is stainless steel coated with plastic. The handle may be about 7 inches in length, and may have an elevation that is 1 to 2 inches above the bottom surface of the paddle. The handle may feature an opening or hole, for example, 3/8 inch wide, for the purpose of facilitating the hanging of the cooking utensil from a hook for storage purposes.

FIGS. 1 and 2 show three circular reservoirs 111, 113, 115 mounted on the top surface 105 of paddle 101. Each reservoir is about 3 inches in diameter and about 1/4 inch in height. The reservoirs are mounted in a straight line, along the longitudinal axis of the paddle. The walls forming the sides of the reservoirs in this aspect of the invention may be formed from sheet metal such as 1/16 (0.0625) inch thick copper, and bonded to the paddle, for example, by brazing or welding. Thus, the top surface of the paddle forms the flat, bottom surface of each reservoir, and each reservoir is open to the top (i.e., in an upward direction).

Alternate aspect of the invention

Instead of mounting circular reservoirs to the top surface of the paddle, the circular reservoirs could be made integral with the paddle. For example, the paddle and reservoir could be fashioned from a single sheet of copper stock, for example, by forging or stamping the reservoirs into the stock.

Figure 4:
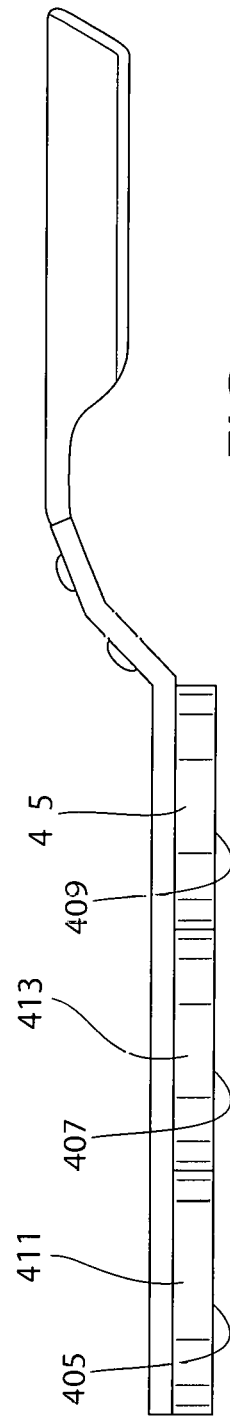
FIG. 4 is a side view of an alternate embodiment of the invention.
Figure 5:
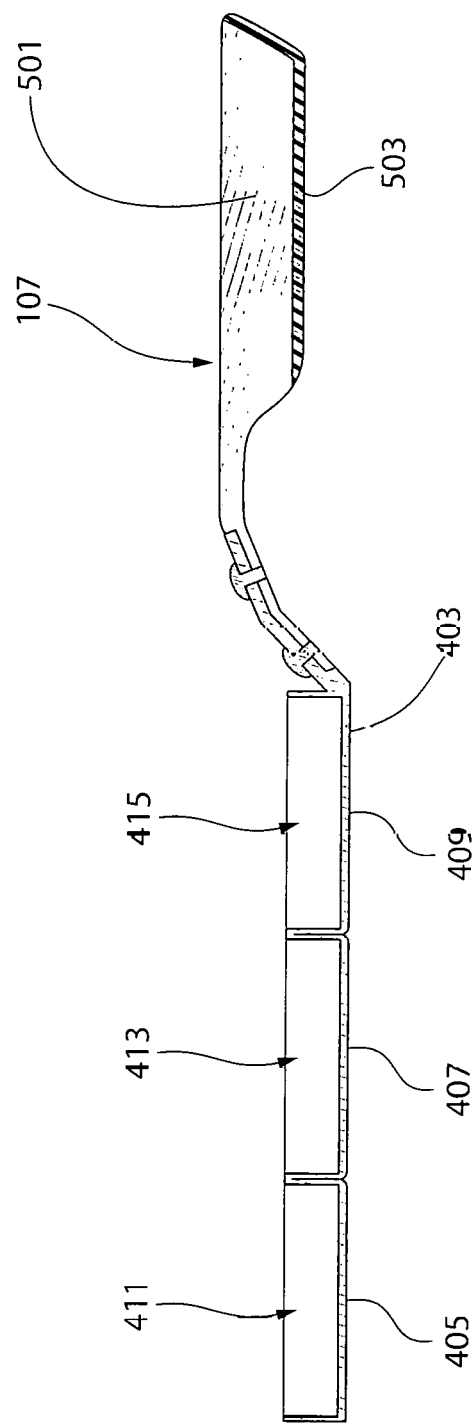
FIG. 5 is a cross-sectional view of the alternate embodiment.

FIGS. 4 and 5 show an alternate embodiment of the invention where, instead of mounting circular reservoirs on top of a flat planar top surface, the reservoirs are formed by pressing or punching depressions into a flat planar surface. Thus, the reservoirs extend downward from the top surface of the paddle. Copper is a highly malleable metal, and such cavity formation can be accomplished without tearing the copper. The bottom surface 403 is still closed and planar so that the bottoms 405, 407, 409 of the circular reservoirs 411, 413, 415 are simultaneously in contact with a planar surface of the heat source, such as a frying pan or griddle. Further, each reservoir is still open to the top (i.e., in an upward direction), but in this aspect of the invention, the top of the reservoir is flush with the top surface of the paddle. In the cross-sectional view that is FIG. 5, handle 107 can be seen to feature metal stock 501 coated with plastic 503.

Various embodiments

In addition to the major aspects of the invention, each aspect may feature different embodiments, or variations.

For example, each aspect of the invention may feature one, two or three reservoirs. Each aspect may feature reservoirs that range in size, or "effective diameter" of nominally about 3 to 4 inches. Each aspect may feature reservoirs that 1/4 inch to about 1/2 inch in depth, although certain foods such as hamburgers may call for a greater reservoir depth such as about 1 inch. Each aspect of the invention may feature reservoirs that are circular, or a different shape such as oval, elliptical, egg-shaped, or custom-shaped such as being shaped as a (valentine) heart, a three or four-leaf clover, or a rabbit head. For those embodiments that feature multiple reservoirs, the reservoirs may be mounted nominally linearly along a longitudinal axis of the paddle. Each aspect of the invention may feature a paddle fabricated from copper, aluminum, or steel such as stainless steel. Each aspect of the invention may feature a handle fabricated from wood, plastic, or even certain low thermal conductivity metals. Each aspect of the invention may feature a "non-stick" substance such as TEFLON (a trademark of the DuPont Company) coating at least the interiors of the reservoirs to form a "non-stick" surface.

How to use the invention

Holding the spatula-like cooking utensil level, or placing it on a level surface with the reservoirs facing up, that is, opening upwardly, a raw egg is cracked open and deposited into a circular reservoir. The other reservoirs may be used, or not. The utensil containing at least one egg is then contacted with a cooking surface such as a griddle or frying pan, or other hot surface, with the circular reservoirs facing up. The egg will begin to cook and solidify, at least on its bottom surface and around the side. At some point, the egg(s) will be sufficiently solid or rigid as to permit the utensil to be inverted, dumping the egg(s) out of the circular reservoir(s) and onto the cooking surface, but without causing spatter, and while maintaining the circular shape of the partially cooked egg(s). The surface of the egg(s) that previously was facing up, away from the cooking surface, now is in contact with the cooking surface, thereby cooking the egg(s) in "over easy" or "fried" fashion. Alternatively, to cook the egg(s) in "sunny side up" fashion, rather than dumping the egg(s) out of the cooking utensil onto the cooking surface, the utensil is left in its initial position until the egg yolk is cooked to a desired consistency. If the cooking surface is a frying pan, placing a cover such as the lid over the frying pan will accelerate the cooking of the egg yolk(s).

The various aspects and embodiments of the instant invention can be used in domestic or household environments, in commercial environments such as restaurants, or in recreational such as outdoor environments such as on camping trips. It makes a valuable addition to most any kitchen.

INDUSTRIAL APPLICABILITY

The instant cooking utensil invention should find utility not only in cooking eggs but also in pancakes, salmon patties, scrapple, small hamburgers ("sliders"), or in fact in cooking any food that initially is in a liquid, solution, slurry or suspension form prior to cooking. With the instant invention, eggs may be cooked "sunny side up", with the cooked egg maintaining a nearly perfect circular shape. In contrast, without the instant modified spatula utensil, the "white" of the egg may expand radially and/or may expand non-uniformly, particularly if the frying pan or other frying surface is not level. The egg yolk may follow the movement of the egg white during cooking.

The instant kitchen utensil invention is also useful for cooking eggs in "over easy" or "fried" configuration, in which the egg is cooked first on its bottom surface, and then flipped over to cook the (former) top surface. In particular, the instant invention permits the eggs to be cooked sufficiently on the bottom surface such that when they are turned over, there is no spatter as there is in cooking such eggs using a prior art spatula. The spatter, sometimes called "spider webs" is unattractive and unappetizing. Nevertheless, if the consumer wants his eggs over-easy but with runny egg yolks, this can still be accomplished using the instant cooking utensil.

Among the advantages of the instant invention over the known art is the ability to cook eggs or other initially "runny" foods and maintain a uniform shape. The instant modified spatula invention also eliminates the problem in the prior art of such foods spattering when they are flipped over in a frying pan to cook the other side. Further on this point, the instant invention permits at least eggs, and possibly also pancakes, to be made thicker ("meatier") than what is possible in the absence of the instant invention. Specifically, the reservoirs of the instant cooking utensil contain the egg or pancake during the cooking process, and prevent the egg or pancake from expanding too much radially.

An artisan of ordinary skill will appreciate that various modifications may be made to the invention herein described without departing from the scope or spirit of the invention as defined in the appended claims.

What is claimed is:

1. A cooking utensil, comprising:
   (a) an elongated metal paddle having a heat conductive region;
   (b) a plurality of reservoirs attached to said paddle and configured to confine a runny, liquidy or fluidy uncooked food, said reservoirs being closed on the bottom, open toward to the top, having at least one wall being at least ¼ inch in height, and having an effective diameter of at least 3 inches;
   (c) a spatula handle attached to a proximal end of said paddle;
   (d) at least one exterior bottom surface, provided on the metal paddle and each of said at least one bottom surface defining a plane, whereby said cooking utensil makes good contact with a flat surface; and
   (e) wherein at least said paddle, plurality of reservoirs, and spatula handle are unitary.

2. The cooking utensil of claim 1, wherein said plurality of reservoirs are circular, and said effective diameter is a diameter of a circle.

3. The cooking utensil of claim 1, wherein said plurality of reservoirs have a top-view shape selected from the group consisting of a valentine heart, a clover, a rabbit, an ellipse, an oval and an egg.

4. The cooking utensil of claim 1, wherein said paddle is nominally 9 inches in length.

5. The cooking utensil of claim 1, wherein said paddle is nominally 3 inches in width.

6. The cooking utensil of claim 1, wherein said paddle is nominally planar.

7. The cooking utensil of claim 1, wherein said metal comprises a metal selected from the group consisting of copper, aluminum and steel.

8. The cooking utensil of claim 1, wherein said handle is fabricated from a thermally insulating material.

9. The cooking utensil of claim 1, wherein said handle is fabricated from a material selected from the group consisting of wood, stainless steel and plastic.

10. The cooking utensil of claim 1, wherein said reservoirs extend upward from a top surface of said paddle.

11. The cooking utensil of claim 1, wherein said reservoirs extend downward from a bottom surface of said paddle.

12. The cooking utensil of claim 1, wherein said handle is elevated at least one inch with respect to said paddle.

13. An article comprising a cooking utensil, comprising:
   (a) a heat conductive region having a proximal end, an upper surface and a lower surface, said lower surface comprising at least one planar surface;
   (b) a spatula handle attached to said proximal end of said heat conductive region; and
   (c) said upper surface comprising a plurality of circular reservoirs, each of said reservoirs defining sufficient volume as to be able to hold a large hen's egg; and
   (d) wherein at least said heat conductive region, said spatula handle, and said plurality of circular reservoirs are unitary.

14. A cooking utensil, comprising:
   (a) a heat-conductive paddle having at least a proximal end;
   (b) a spatula handle attached to said proximal end and elevated with respect to said paddle;
   (c) a plurality of reservoirs attached to and extending downward from said paddle, and configured to confine a runny, liquidy or fluidy uncooked food, wherein bottom exterior surfaces of said plurality of reservoirs are closed and planar so as to simultaneously contact a flat surface; and
   (d) wherein said paddle, handle and reservoirs are unitary.

15. The cooking utensil of claim 14, wherein said paddle and reservoirs are fashioned from a single piece of metal.

16. The cooking utensil of claim 14, wherein said handle is heat-insulating.

17. The cooking utensil of claim 14, wherein said reservoirs have a top-view shape selected from the group consisting of a valentine heart, a clover, a rabbit, a circle, an ellipse, an oval and an egg.

* * * * *